United States Patent [19]

Mori

[11] 4,176,636

[45] Dec. 4, 1979

[54] INTERNAL COMBUSTION ENGINE HAVING EXHAUST EMISSION CONTROL SYSTEM

[75] Inventor: Haruo Mori, Tokyo, Japan

[73] Assignee: Fuji Jukogyo Kabushiki Kaisha, Tokyo, Japan

[21] Appl. No.: 894,370

[22] Filed: Apr. 7, 1978

Related U.S. Application Data

[62] Division of Ser. No. 639,159, Dec. 9, 1975, Pat. No. 4,099,497.

[30] Foreign Application Priority Data

Dec. 26, 1974 [JP] Japan ................................ 49/502336

[51] Int. Cl.[2] ......................... F02B 33/00; F02P 5/04; F16K 47/04

[52] U.S. Cl. ........................... 123/119 A; 123/117 A; 251/124; 138/42

[58] Field of Search ....................... 123/117 A, 119 A; 138/42, 43; 137/613; 251/120, 121, 124

[56] References Cited

U.S. PATENT DOCUMENTS

| | | | |
|---|---|---|---|
| 621,864 | 3/1899 | Smith | 137/613 |
| 868,599 | 10/1907 | Coleman | 137/613 |
| 1,133,650 | 3/1915 | Lentz | 251/124 |
| 1,986,600 | 1/1935 | Pigott | 251/124 |
| 2,261,531 | 11/1941 | Thomas | 251/124 |
| 3,385,275 | 5/1968 | Burnia et al. | 123/117 A |
| 3,699,936 | 10/1972 | Vartanian | 123/117 A |

FOREIGN PATENT DOCUMENTS

| | | | |
|---|---|---|---|
| 2558414 | 7/1976 | Fed. Rep. of Germany | 123/117 A |
| 1383112 | 2/1975 | United Kingdom | 138/42 |

*Primary Examiner*—Charles J. Myhre
*Assistant Examiner*—P. S. Lall
*Attorney, Agent, or Firm*—Martin A. Farber

[57] ABSTRACT

Air bleeding apparatus for an exhaust emission control system comprising three plates joined face to face. The first plate has a plurality of grooves each communicating at one end with a vacuum source and at the other end with a vacuum actuator for an ignition timing control system or an exhaust gas recirculation control valve. The second plate has a plurality of orifices communicating with the grooves, respectively; the third end plate has a vent hole therethrough and grooves diverging from the vent hole and respectively communicating with the orifices. The second plate is joined abuttingly to and between the first and third plates whereby the grooves form conduits therewith, whereby the conduits of the first plate communicate with the vent hole of the third plate through the respective orifices of the second plate and the respective conduits of the third plate. The characteristics of the apparatus may be varied by changing the second plate to one having different orifices.

2 Claims, 11 Drawing Figures

INTERNAL COMBUSTION ENGINE HAVING EXHAUST EMISSION CONTROL SYSTEM

This is a division, of application Ser. No. 639,159 U.S. Pat. No. 4,099,497 filed Dec. 9, 1975.

The present invention relates generally to air bleeding apparatus for a vacuum actuator in an exhaust emission control system for internal combustion engines.

For the purpose of reducing exhaust emissions from an internal combustion engine it has heretofore been proposed to have the engine equipped with an exhaust emission control system. More particularly, the engine is equipped with a vacuum spark timing control device to advance or retard the spark timing, an exhaust gas recirculation apparatus having a vacuum operated recirculation control device, and conduit means connecting the spark timing control device and the recirculation control device to an intake passageway of the engine to apply the intake passageway vacuum to the spark timing control device and to the recirculation control device.

Upon installing the exhaust emission control system, the exhaust gas recirculation flow rate must meet the nitrogen oxides ($NO_x$) control requirements and the spark timing must be adjusted to meet the actual engine requirements. The characteristics of the exhaust emission control system therefore must be altered by replacing components in dependency on the engine characteristics. Thus, the productivity of the engine equipped with an exhaust emission control system is worse than that of an engine without an exhaust emission control system.

It is an object of the present invention to provide an apparatus which may provide an exhaust emission control system, the characteristics of which may easily be altered.

In accordance with the present invention, the apparatus comprises a first plate having a flat face formed with a plurality of first grooves each to be communicated with a vacuum source at one end and with a vacuum actuator at the other end, a second plate adjacent to the first place to close the grooves to form conduits therewith, the second plate being formed with orifices communicating with the first grooves, respectively, and a third plate adjacent to the second plate, the third plate having a vent hole formed therethrough and having a flat face formed with second grooves communicating with the orifices and the vent hole. The second grooves diverge from the vent hole and are covered by the second plate to form channels therewith, the second plate being abuttingly joined to and between the first plate and the third plate, whereby various vacuum pressures from the vacuum sources to a plurality of vacuum actuators may be regulated by a single air bleeding apparatus. The characteristics of the apparatus may be varied by changing the second plate to one having different orifices, whereby the characteristics of the exhaust emission control system may be altered.

With the above and other objects and advantages in view, the present invention will become more clearly understood in connection with the following detailed description of a preferred embodiment, when considered with the accompanying drawings, of which:

Figure 1:
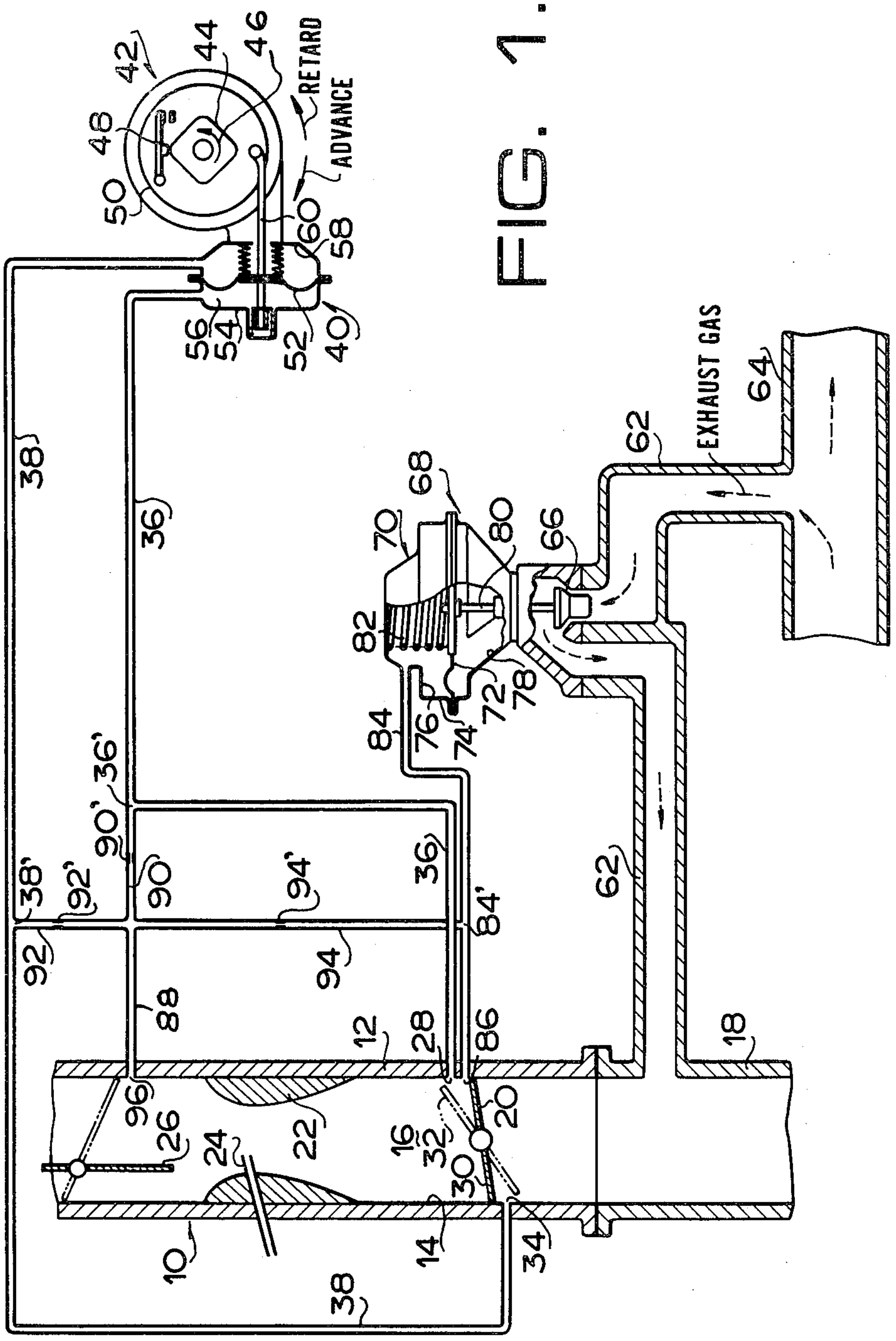
FIG. 1 is a schematic view of a portion of an internal combustion engine equipped with a preferred embodiment of an exhaust emission control system using an apparatus of the present invention.
Figure 3:
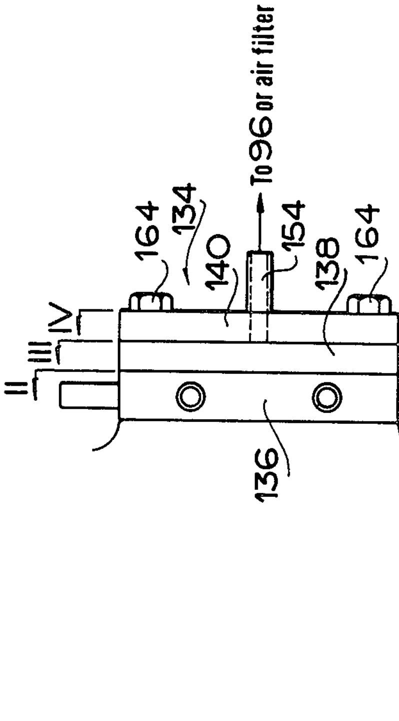
FIG. 3 is a side view of the air bleeding apparatus of the present invention.
Figures 5A, 5B, 5C:
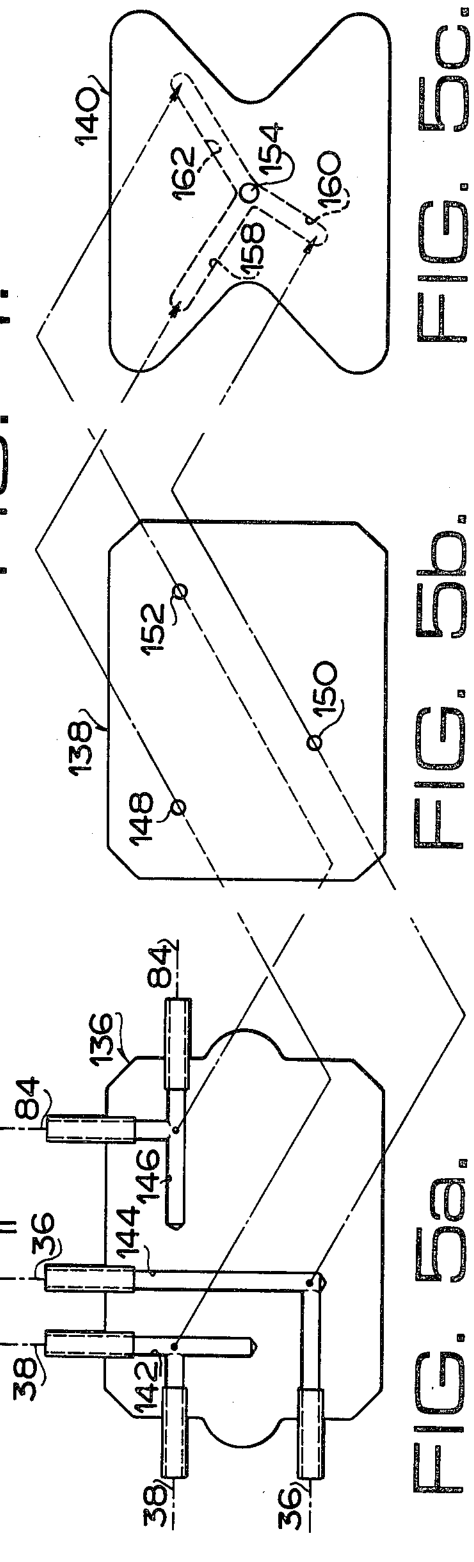
Figures 6A, 6B, 6C:
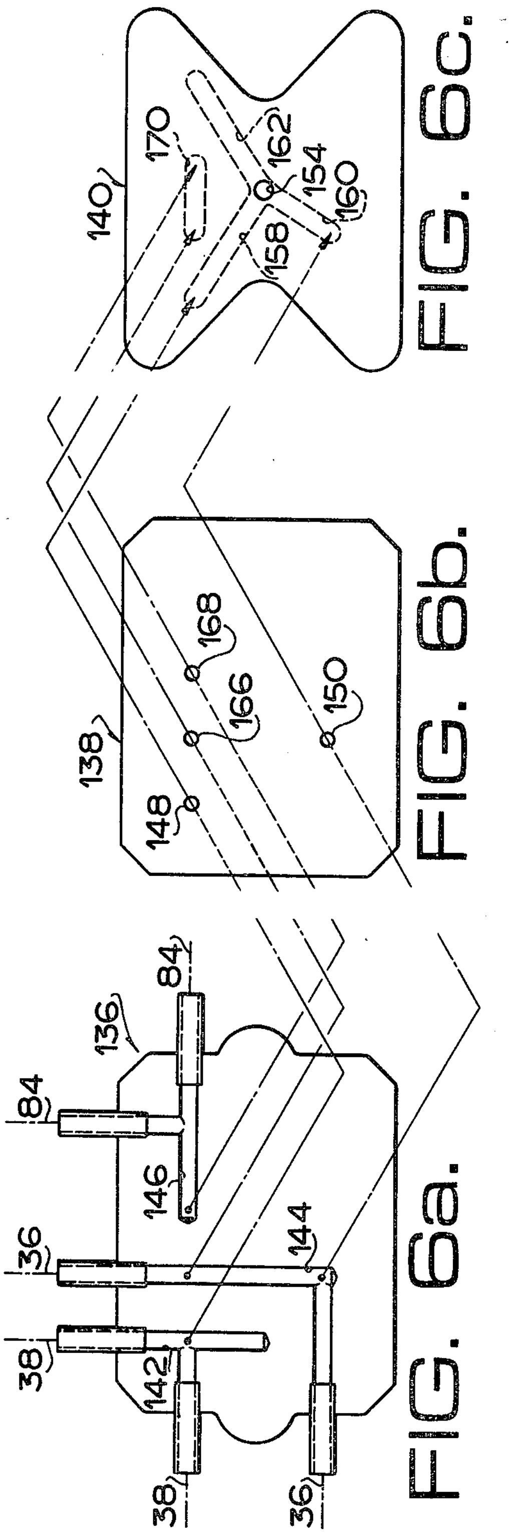
Figure 7:
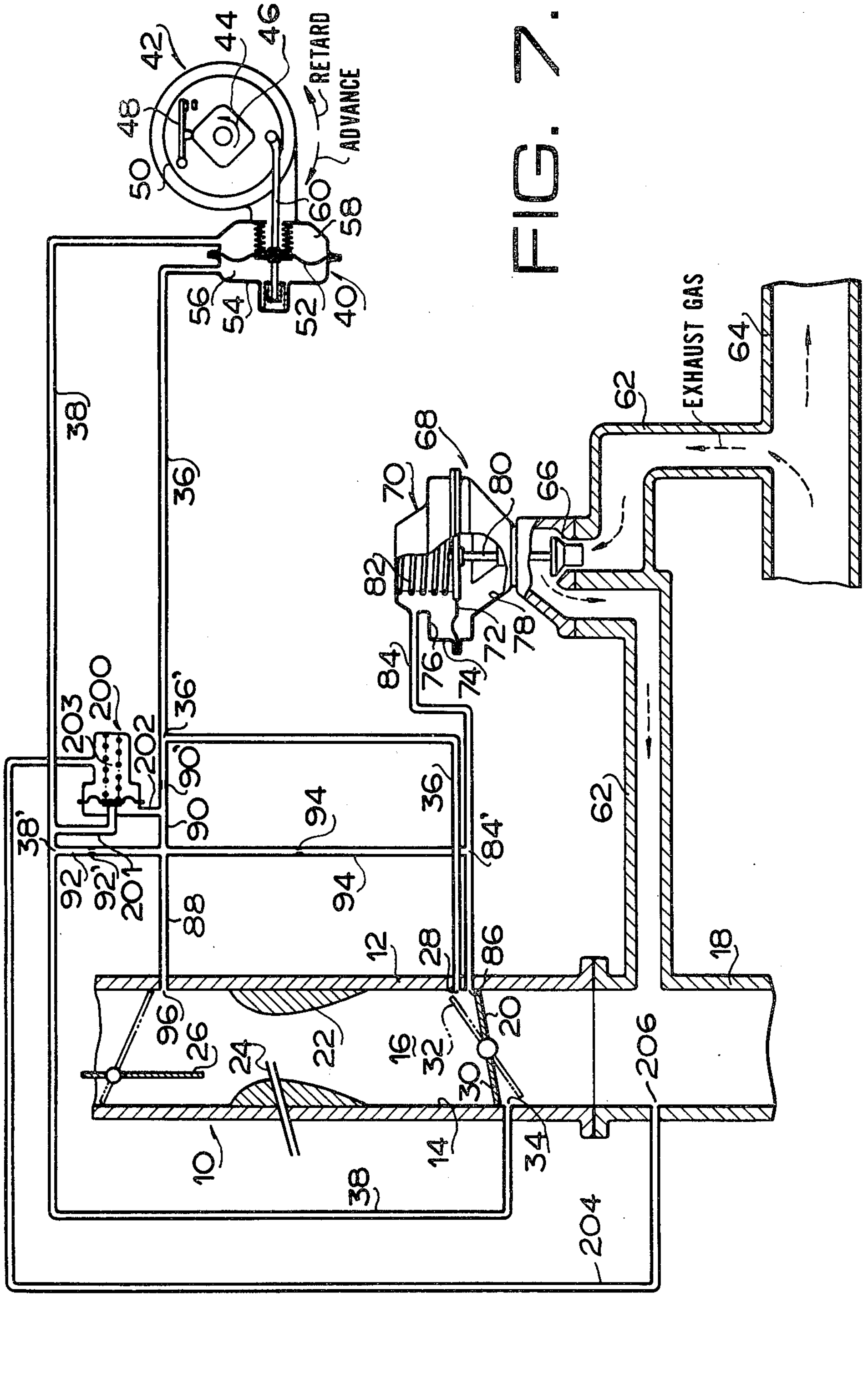

FIG. 5*a*, 5*b* and 5*c* are exploded views of the apparatus shown in FIG. 3 as viewed through the lines II—II, III—III and IV—IV;

FIG. 6*a*, 6*b* and 6*c* are similar exploded views showing another embodiment of the present invention; and FIG. 7 is a view similar to FIG. 1, but showing still another preferred embodiment of an exhaust emission control system.

Referring particularly to the accompanying drawings, like reference numerals are used throughout all Figures to designate like parts.

Referring to FIG. 1 of the accompanying drawings, a portion 10 of a carburetor is illustrated. The carburetor is provided with a main body portion 12 having a cylindrical bore 14 providing a conventional intake passageway 16. The latter is connected to a conventional intake manifold 18, from which air and fuel mixture passes to the engine cylinders, not shown, in a known manner.

The flow of air and fuel mixture through the intake passageway 16 is controlled by a conventional throttle valve 20. A conventional venturi section 22 is provided above the throttle valve 20 and a conventional fuel nozzle 24 opens at the venturi section 22 to induce fuel into the intake passageway 16 above the throttle valve 20 in a known manner. A conventional choke valve 26 is mounted adjacent the inlet of the intake passageway 16 to control the amount of air flowing into the passageway 16.

The main body portion 12 of the carburetor 10 has a port 28 formed at a location adjacent to, and on the upstream side of the throttle valve 20 when the throttle valve 20 is closed in idle speed position 30 and on the downstream side of the throttle valve 20 when the throttle valve is rotated to its partly opened position 32 as shown by a phantom line in FIG. 1. The carburetor 10 also has a port 34 formed at a location adjacent to, and on the downstream side of the throttle valve 20 when the throttle valve 20 is in the idle speed position 30 and on the upstream side of the throttle valve 20 when the throttle valve is partly opened as shown by the dotted line 32. A vacuum conduit 36 and a vacuum conduit 38 are connected to a vacuum actuator 40 of the double action type in a distributor 42. The vacuum to the conduit 36 is supplied from the port 28, while the vacuum to the conduit 38 from the port 34.

The distributor 42 includes a usual cam 44 which rotates in a direction indicated by an arrow 46. The cam 44 operates a conventional circuit breaker 48 mounted on a breaker plate 50 which can be rotated clockwise to advance the spark timing counterclockwise to retard the spark timing by the vacuum actuator 40. The vacuum actuator 40 comprises a flexible diaphragm 52 mounted in a casing 54. The diaphragm 52 divides the casing 54 into a vacuum chamber 56 to which the vacuum conduit 36 is connected and into a vacuum chamber 58 to which the vacuum conduit 38 is connected. A plunger 60 is secured at one end to the diaphragm 52 and pivoted at the opposite end to the breaker plate 50 so as to advance the spark timing when the plunger 60 moves to the left and to retard the spark timing when the plunger moves to the right. Thus the chamber 56 is often referred to as "spark advance chamber", while the chamber 58 as "spark retard chamber".

To recirculate a portion of exhaust gases into the intake manifold 18, an exhaust gas recirculation conduit 62 leads from an exhaust pipe 64 to the intake manifold 18, in a known manner.

The recirculation conduit 62 is normally closed by a valve 66 of a conventional exhaust gas recirculation control device 68 having a vacuum actuator 70 for opening the normally closed valve 66. The vacuum actuator 70 has a spring loaded diaphragm 72 mounted in a casing 74 to divide the casing 74 into an upper vacuum chamber 76 and a lower atmosphere pressure chamber 78. A valve stem 80 has one end secured to the diaphragm 72 and the opposite end secured to a valve element of the valve 66. A spring 82 in the vacuum chamber 76 biases the diaphragm 72 downwardly, causing the valve 66 to close the exhaust gas recirculation conduit 62. A vacuum conduit 84 is connected to the vacuum chamber 76 of the vacuum actuator 70. The vacuum to the conduit 84 is supplied from a port 86 that opens to the intake passageway 16 at a location adjacent to, and on the upstream side of the throttle valve 20 when the throttle valve 20 is closed in idle speed position 30 and on the downstream side of the throttle valve 20 when the throttle valve is partly opened to the dotted line position 32.

Vacuum in the vacuum conduit 36 is modulated by bleeding air through a suitable opening 36′ in the conduit 36 per se, the vacuum in the vacuum conduit 38 is modulated by bleeding air through a suitable opening 38′ in the conduit 38 per se, and the vacuum in the vacuum conduit 84 is modulated by bleeding air through a suitable opening 84′. The air bleeding means comprises an atmospheric pressure conduit 88 and three branch conduits 90, 92 and 94 from the atmosphere conduit 88. The branch conduits 90, 92 and 94 open to the vacuum conduits 36, 38 and 84, respectively, through their openings 36′, 38′ and 84′. Each of the conduits 90, 92 and 94 is provided with a restricting means such as an orifice. The conduits 90, 92 and 94 include restrictors or orifices 90′, 92′ and 94′, respectively. Preferably, the atmospheric conduit 88 communicates with the intake passageway 16 at a port 96 on the inlet side of the venturi section 22. The atmospheric conduit 88 may communicate with an air cleaner of the engine or may directly open to the ambient atmosphere through a suitable filter.

The operation of the system illustrated in FIG. 1 is as follows.

When the throttle valve 20 is closed in the idle position 30, pressure in the intake passageway 16 becomes negative and the vacuum is therefore imposed to the spark retard chamber 58 of the vacuum actuator through the vacuum conduit 38, thereby rotating the breaker plate 50 in a direction to retard the spark timing. When the throttle valve 20 is partly opened to the position 32, the vacuum at the port 34 decreases and approaches the atmospheric pressure and the vacuum generates at the ports 28 and 86. When the throttle valve 20 is opened wider than the partly opened position 32 for acceleration, the vacuum is supplied to the vacuum conduit 36 through the port 28 and the vacuum to the vacuum conduit 84 through the port 86. The vacuum is therefore imposed to the spark advance chamber 56 of the vacuum actuator 40, thereby rotating the breaker plate 50 in a direction to advance the spark timing, while the vacuum is imposed to the vacuum chamber 76 of the vacuum actuator 70 of the exhaust gas recirculation control device 68, effecting the exhaust gas recirculation.

From the preceding description of the system illustrated in FIG. 1, it should be noted that the system characteristics may be modulated easily by varying the effective cross sectional area of each of the orifices 90′, 92′ and 94′ in the air bleeding means.

Figure 2:
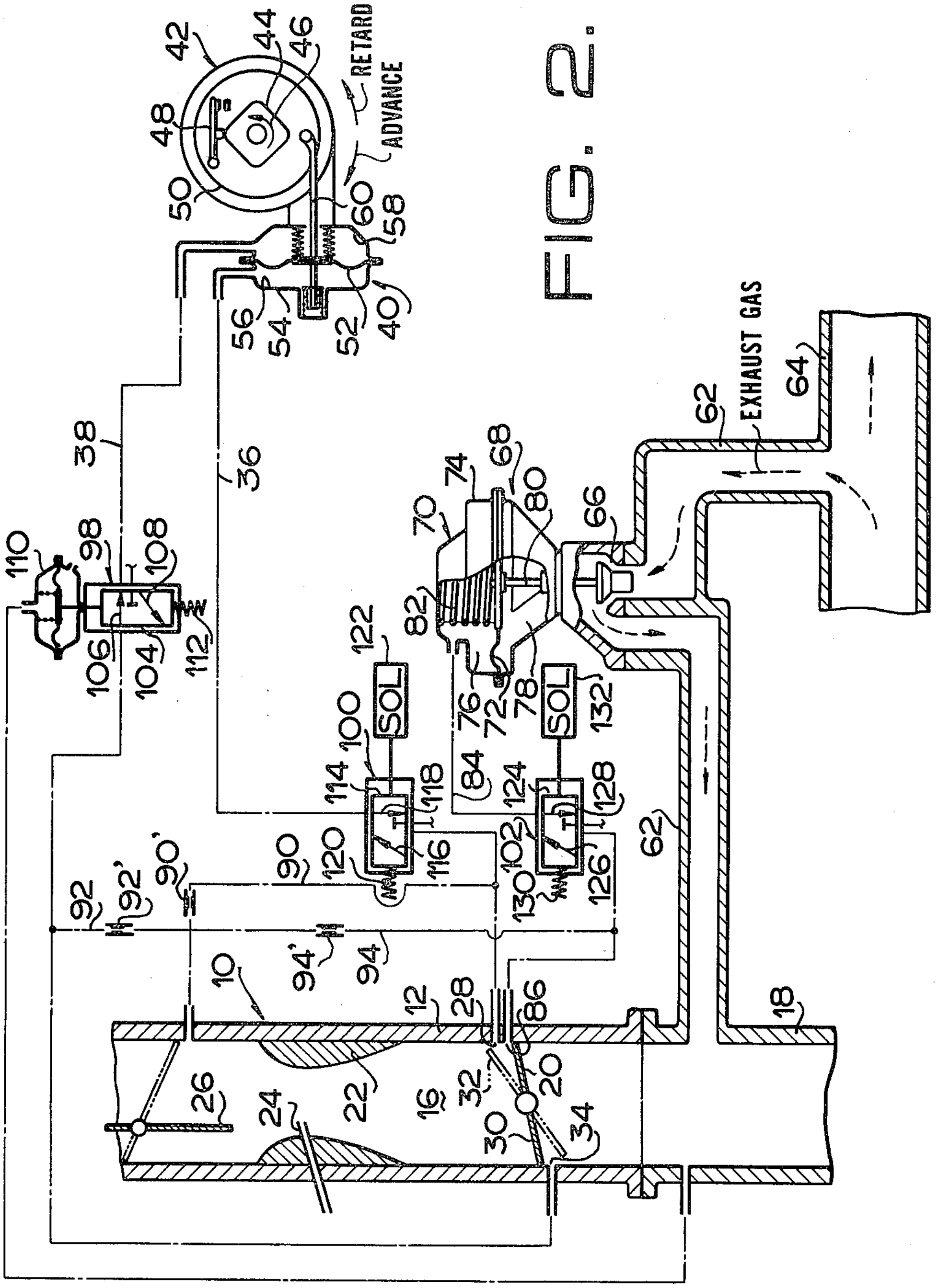
FIG. 2 is a similar view to FIG. 1 showing another preferred embodiment of an exhaust emission control system using the apparatus of the present invention.

Referring to FIG. 2, the system shown herein is similar to that shown in FIG. 1 except that there are provided a first valve means 98 for venting the vacuum conduit 38 and the spark retard chamber 58 during deceleration of the engine; a second valve means 100 for venting the vacuum conduit 36 and the spark advance chamber 56 during engine operation at low engine speeds; and a third valve means 102 for venting the vacuum conduit 84 and the vacuum chamber 76 during engine operation at low engine temperature.

The valve 98 is provided with a slidable valve 104 having a straight through passage 106 and a vent passage 108. A vacuum servo or actuator 110 is connected to the intake manifold 18 and actuated by the intake manifold vacuum. A spring 112 positions the valve 104 as shown to connect port 34 to the chamber 58 through the vacuum conduit 38 when the vacuum servo 110 is deactuated. The vacuum servo or actuator 110 is actuated when the intake manifold vacuum is higher than a predetermined reference intake manifold vacuum. The vacuum servo or actuator 110 when actuated moves the valve 104 to vent the conduit 38.

The valve 100 is provided with a slidable valve 114 having a straight through passage 116 and a vent passage 118. A spring 120 positions the valve 114 as shown to vent vacuum conduit 36 when a solenoid 122 is deenergized. The solenoid 122 when energized moves the valve 114 to connect the port 28 to the chamber 56 through the conduit 36. The solenoid 122 is connected to an engine speed responsive switch of the normally open type, not shown, which is closed when the engine speed is higher than a predetermined reference engine speed. Thus, the solenoid 122 is energized when the engine speed is higher than the predetermined reference engine speed.

The valve 102 is provided with a slidable valve 124 having a straight through passage 126 and a vent passage 128.

A spring 130 positions the valve 124 as shown to vent vacuum conduit 84 when a solenoid 132 is deenergized. The solenoid 132 when energized moves the valve 124 to connect port 86 to vacuum chamber 76 of a recirculation control device 68. The solenoid 132 is connected to an engine temperature responsive switch of normally open type, not shown, which is closed when the engine temperature is higher than a predetermined reference temperature. Thus, the solenoid 132 is energized when the engine temperature is higher than the predetermined reference temperature. It should be noted that the engine temperature is represented by the temperatures of various parts or components of the engine such as coolant, oil, etc. or the temperature of the cylinder wall of the engine.

The operation of the system shown in FIG. 2 is as follows.

When throttle valve 20 is closed in idle position 30, the vacuum is imposed to the spark retard chamber 58, biasing breaker plate 50 toward spark retard position because the valve 104 is positioned as shown. At idle engine speed, the spark advance chamber 56 is vented because the valve 114 is positioned as shown. When the throttle valve 20 is opened wider than the partly opened position 32 for acceleration, the vacuum at the port 34 approaches the atmospheric pressure, while the vacuum develops at the ports 28 and 86. If, now, the engine speed exceeds the predetermined reference engine speed and the engine temperature is higher than the predetermined reference temperature, the solenoid 122 moves the valve 114 to a position to connect the port 28 to the conduit 36 and the solenoid 132 moves the valve 124 to a position to connect the port 86 to the conduit 84. As a result, the spark timing is advanced and the exhaust recirculation is effected.

In the air bleeding means shown in FIG. 1 or 2 three orifices 90', 92' and 94' are disposed in the branch conduits 90, 92 and 94, respectively. An air bleed apparatus of the present invention is generally denoted by the numeral 134, in FIGS. 3, 4, 5*a*, 5*b* and 5*c*.

Figure 4:
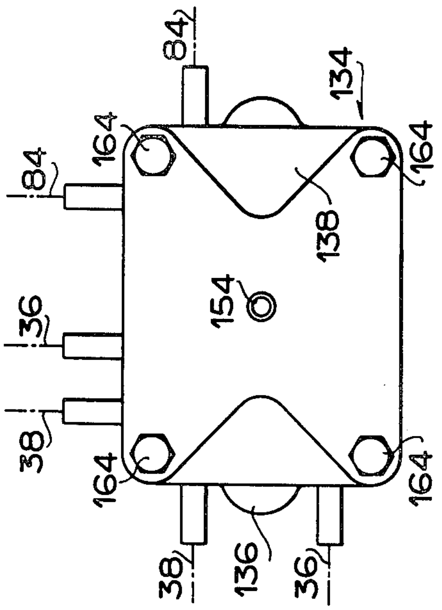
FIG. 4 is a plan view of the apparatus shown in FIG. 3.

The air bleed apparatus 134 comprises a first plate 136, a second plate 138 and a third plate 140. The first plate 136 is formed with grooves 142, 144 and 146 as shown in FIG. 5*a*. The second plate 138 is joined face to face to the first plate 136 to cover the grooves 142, 144 and 146 to form conduits that are connected to and form parts of the vacuum conduit 38, 36 and 84, respectively (see FIGS. 4, 5*a* and 5*b*). The second plate 138 is formed with restrictors or orifice openings 148, 150 and 152 (see FIG. 5*b*) that are positioned to communicate with the grooves 142, 144 and 146, respectively. The third plate 140 is joined face to face to the second plate 138. The third plate 140 is formed with a vent hole 154 which preferably communicates with the atmosphere through an air filter (not shown) or which may communicate with the intake passageway 16 at a port 96 on the upstream side of the venturi section 22 (see FIGS. 1 or 2), and is formed with grooves 158, 160 and 162 diverging from the vent hole 154. The grooves 158,160 and 162 are disposed to communicate with the orifice openings 148, 150 and 152, respectively. The plates 136,138 and 140 are joined face to face one after another as shown in FIG. 3 or 4 by a plurality of bolts 164.

It should be understood that air bleeds into the vacuum conduit 38 through the vent port 154, groove 158, orifice hole 148, that air bleeds into the vacuum conduit 36 through the vent hole 154, groove 160 and orifice hole 150, and that air bleeds into the vacuum conduit 84 through the vent hole 154, groove 162 and orifice hole 152. It should be appreciated that the orifice size can be varied by replacing the second plate 138 with another one. Therefore, characteristics of the exhaust emission control system may be easily altered by changing the second plate for another one having a different orifice size.

Referring to FIGS. 6*a*, 6*b* and 6*c*, an air bleed apparatus shown herein is different from the preceding apparatus (shown in FIGS. 3, 4, 5*a*, 5*b* and 5*c*) in that the second plate 138 (see FIG. 6*b*) is formed with restrictors or orifice holes 166 and 168 positioned to communicate with grooves 144 and 146, respectively, and a third plate 140 is formed with a recessed portion 170 disposed to communicate with the orifice holes 166 and 168. It should be noted that air bleeds into a groove 146 in flow communication with a vacuum conduit 84 through a vent port 154, groove 160 (see FIG. 6*c*), orifice hole 150, groove 144 (see FIG. 6*a*), orifice hole 166, recessed portion 170, orifice hole 168. With this internal fluid connection fluid leakage will be more effectively prevented.

FIG. 7 illustrates still another embodiment of an exhaust emission control system. This illustrated embodiment is similar to FIG. 1 except that a vacuum control valve 200 is connected between the vacuum conduits 36 and 38. The vacuum control valve 200 comprises a casing in which a flexible diaphragm is disposed and divides the casing into an atmospheric chamber and a vacuum chamber 203. The vacuum control valve 200 includes a first conduit 201 connected at its one end to the vacuum conduit 38. Another end of the conduit 201 projects into the atmospheric chamber and is opened and closed by the diaphragm. A second conduit 202 is connected at its one end to the atmospheric chamber of the vacuum control valve 200 and connected at its another end to the vacuum conduit 36 at a position upstream of the orifice 90'. The fluid communication between the first and second conduit 201 and 202 is controlled by intake manifold vacuum admitted to the vacuum chamber of the vacuum control valve 200 in which a spring means is disposed for normally urging the diaphragm to a position to interrupt fluid communication between the first and second conduits 201 and 202. To this end, the vacuum chamber of the vacuum control valve 200 is connected to a third conduit 204 communicating with a port 206 opening to the intake manifold 18. During decelerating condition of the engine, if the intake manifold vacuum exceeds a predetermined level, the diaphragm of the vacuum control valve 200 is moved rightward as viewed in FIG. 8 thereby providing fluid communication between the first and second conduits 201 and 202. In this condition, the vacuum in the vacuum conduit 38 is bled through the first and second conduits 201 and 202 into the conduit 88 so that the vacuum to be applied to the spark retard chamber 58 of the vacuum actuator 40 is decreased to a lower level thereby preventing the braker plate 50 from being rotated to a position to excessively retard the spark timing during decelerating operating condition of the engine for thereby improving the combustion efficiency of the engine.

While the present invention has been shown and described with reference to specific preferred embodiments, it should be noted that various changes or modifications may be made without departing from the scope of the present invention.

What is claimed is:

1. Air bleeding apparatus for vacuum actuators in an exhaust emission control system for internal combustion engines comprising a first plate having a flat face formed with a plurality of first grooves, each of said first grooves communicating with a vacuum source at one end and communicating with a vacuum actuator at the other end, a second plate adjacent to said first plate covering said first grooves to form conduits therewith, said second plate being formed with orifices communicating with said first grooves, respectively, a third plate adjacent to said second plate, said third plate having a vent hole formed therethrough and having a flat face formed with second grooves communicating with said orifices and said vent hole, said second gooves diverging from said vent hole, said second grooves being covered by said second plate to form channels therewith, said second plate is joined abuttingly to and between said first plate and said third plate, whereby various vacuum pressures applied from the vacuum sources to a plurality of vacuum actuators may be regulated by a single air bleeding apparatus.

2. The air bleeding apparatus for vacuum actuators as set forth in claim 1, wherein said third plate is formed with an additional groove in said flat face thereof, said additional groove is spaced noncommunicatingly from said second grooves and from said vent hole, said additional groove is disposed in communicating alignment with two of said orifices, one of said two orifices is in communication with one of said first grooves, another of said orifices is in communication with said one of said first grooves and one of said second grooves.

* * * * *